United States Patent
Ten Brink

(10) Patent No.: US 7,546,580 B2
(45) Date of Patent: Jun. 9, 2009

(54) AUTOMATION TOOL AND METHOD FOR SUPPORTING PLANNING AND PRODUCING AN AUTOMATED TECHNICAL PROCESS

(75) Inventor: Carsten Ten Brink, Bad Bentheim (DE)

(73) Assignee: Siemens Aktiengesellschaft, Mumich (DE)

( * ) Notice: Subject to any disclaimer, the term of this patent is extended or adjusted under 35 U.S.C. 154(b) by 335 days.

(21) Appl. No.: 10/980,973

(22) Filed: Nov. 3, 2004

(65) Prior Publication Data

US 2005/0149905 A1    Jul. 7, 2005

Related U.S. Application Data

(63) Continuation of application No. PCT/DE03/01403, filed on May 2, 2003.

(30) Foreign Application Priority Data

May 3, 2002   (DE) ............................... 102 19 912

(51) Int. Cl.
  *G06F 9/44* (2006.01)
(52) U.S. Cl. .................................................... 717/108
(58) Field of Classification Search ......... 717/107–108, 717/135; 702/22, 105; 700/30, 121; 703/1, 703/15; 715/763
See application file for complete search history.

(56) References Cited

U.S. PATENT DOCUMENTS

| | | | |
|---|---|---|---|
| 6,437,805 B1* | 8/2002 | Sojoodi et al. | 715/763 |
| 6,606,588 B1* | 8/2003 | Schaumont et al. | 703/15 |
| 6,618,856 B2* | 9/2003 | Coburn et al. | 717/135 |
| 6,968,538 B2* | 11/2005 | Rust et al. | 717/108 |

FOREIGN PATENT DOCUMENTS

| | | |
|---|---|---|
| DE | 39 11 465 A1 | 10/1990 |
| DE | 196 30 415 A1 | 1/1998 |
| DE | 199 17 102 A1 | 12/2000 |
| EP | 0 770 945 A1 | 5/1997 |

* cited by examiner

*Primary Examiner*—Tuan Anh Vu
(74) *Attorney, Agent, or Firm*—Sughrue Mion, PLLC

(57) ABSTRACT

An automation tool and a method for supporting the planning and implementation of an automated technical process, which uses this automation tool, are provided. The automation tool has access to a library containing a plurality of predefined basic object types associated with a functionality of a technical process. The automation tool has a functionality for generating and interlinking instances of the basic object types and a functionality for deriving structural information relative to the technical process from the type information of each instantiated basic object type.

28 Claims, 6 Drawing Sheets

| | | | |
|---|---|---|---|
| 10. | Technical Process | | |
| 11. | Cement Container | 19. | Mixer |
| 12. | Lime Container | 19a. | Mixer Blade |
| 13. | Sand Container | 20. | Mixer Motor |
| 14. | Water Container | 21. | Aluminum Container |
| 15-18, 22, 23. | Valves | 24. | Mold |
| | | 25. | Controller |
| | | 26. | Control Program |

26. Control Program
27. Automation Tool
28. Library
29. First Functionality
30, 31. Structural Information
32. Second Functionality
33. Plurality of First Object Types
34. Plurality of Second Object Types
35. Plurality of Third Object Types
36. Third Functionality

| 37. | Selection Window |
| 38-42. | First Basic Object Types |
| 43. | Working Window |
| 44-48, 54, 55. | Instances of the First Basic Object Types |
| 49-53, 57, 58. | Attributes of the Instances |
| 56. | Linkages |

| | |
|---|---|
| 37. | Selection Window |
| 43. | Working Window |
| 56. | Linkages |
| 59-63. | Second Basic Object Types |
| 64-70. | Instances of the Second Basic Object Types |
| 71-77. | Attributes of the Instances |

| | |
|---|---|
| 37. | Selection Window |
| 43. | Working Window |
| 56. | Linkages |
| 59-63. | Second Basic Object Types |
| 64, 65, 69, 78, 79, 82. | Instances of the Second Basic Object Types |
| 71, 72, 76, 81-83. | Attributes of the Instances |

| | |
|---|---|
| 37. | Selection Window |
| 43. | Working Window |
| 56. | Linkages |
| 84, 85, 86. | Instances of the Second Basic Object Types |
| 87-89. | Attributes of the Instances of the Second Basic Object Type |
| 90-94. | Third Basic Object Types |
| 95. | Instance of the Third Basic Object Types |
| 96. | Attribute of the Instance of the Third Basic Object Types |

AUTOMATION TOOL AND METHOD FOR SUPPORTING PLANNING AND PRODUCING AN AUTOMATED TECHNICAL PROCESS

This is a Continuation of International Application PCT/DE03/01403, with an international filing date of May 2, 2003, which was published under PCT Article 21(2) in German, and the disclosure of which is incorporated into this application by reference.

FIELD AND BACKGROUND OF THE INVENTION

1. Field of the Invention

The invention relates to an automation tool and a method for supporting the planning and implementation of an automated technical process.

2. Description of Related Art

Various programming languages for generating programs to control and/or monitor an automated technical process, some of which are also object-oriented, are known in the art. However, programming languages of this type and the so-called development environments that can be used in connection therewith are employed at a relatively late stage in the planning and implementation of an automated technical process. In fact, usually these programming languages or development environments are used for generating a control program. Generating the control program, however, is the last step in the planning and implementation of an automated technical process.

For example, before generating the control program, a technologist has to define the product with respect to the required starting products and/or materials, and a designer has to select the equipment (for example, e.g., machines, containers, transport means, etc.) required to produce the product. The control program is written by an automation specialist using the information provided by the technologist and the designer.

A drawback in this related art method and in the use of the known programming languages, development environments, etc., is that information needs to be transferred from one specialist to the next. In the process of such a transfer, information is often lost or distorted because each specialist has his or her own way of thinking about the automated technical process and uses his or her own language to describe the automated technical process.

In other words, production and automation specialists (hereinafter referred to as designers and automation specialists, respectively) are required to receive specifications from other specialists (hereinafter referred to as technologists) who define the characteristics of the product.

The technologist is the planner of the corresponding product and produces, for example, the model of a motor vehicle in the form of individual body parts with welds or other connecting points, or the formula for a drug. The technologist essentially thinks in terms of product features, market conditions, competition, economic efficiency, etc. Other important influencing factors for the technologist are criteria such as production times, production costs, and product innovations.

The designer is the planner of the production installation. The designer specifies machines and equipment to transport or handle and interconnect the body parts, or to provide, mix, and chemically or thermally influence the precursor materials of the drug. The designer essentially thinks in terms of physical processes or physical quantities. The designer takes into account items such as plant parts, (pipe) lines and (starting) materials or their movements or mobility.

The automation specialist plans the automation of the resulting technical process. The automation specialist creates a control program to control the machines or equipment, the transport and processing of the starting materials or products to ultimately produce the end product. The automation specialist essentially thinks in terms of digital quantities and final states or smaller independent units. The automation specialist considers control functions, time sequences, drives and driving elements, positions of moved or movable components in the process and states of the process. The automation specialist is familiar with so-called state graphs and is used to dividing the technical process into separable partial processes, with which the automation specialist deals successively. The automation specialist's way of thinking is, therefore, more oriented toward details than the overall context of the technical process.

Extensive coordination is required among the individual specialists. This coordination takes place at least between the technologist and the designer on the one hand and the designer and the automation specialist on the other. Distributing the tasks among several specialists who have different ways of thinking and who until now have each used different automation tools for their scope of responsibilities results in substantial problems, only a few of which will be identified below by way of example.

First and foremost, communication problems occur among the specialists involved. This is essentially due to the different language they use. Hence, communication primarily involves translated information, i.e., the designer, when trying to draw the automation specialist's attention to specific features of the mechanical system, attempts to think like the automation specialist and explain the problem in his language. If the designer fails to do this translation but uses his own language to describe the problem to the automation specialist, the automation specialist translates what he has heard or read into his own way of thinking. The example can of course be expanded to include every possible and meaningful communication among the specialists involved.

The consequence of this continuously required translation of information is a loss of information. For example, the designer may not, or only incompletely or incorrectly relay information to the automation specialist that he received from the technologist which is no longer particularly important to him. Such loss of information almost necessarily leads to inconsistencies in the data used. In addition, the coordination and discussions frequently required among the specialists involve a potential deadline problem and a substantial loss of time.

OBJECTS OF THE INVENTION

Thus, one object of the present invention is to obviate the aforementioned drawbacks.

Illustrative, non-limiting embodiments of the present invention may overcome the above disadvantages and other disadvantages not described above. The present invention is not necessarily required to overcome any of the disadvantages described above, and the illustrative, non-limiting embodiments of the present invention may not overcome any of the problems described above. The appended claims should be consulted to ascertain the true scope of the invention.

SUMMARY OF THE INVENTION

According to an illustrative, non-limiting formulation of the present invention, an automation tool for supporting the planning and implementation of an automated technical process is provided. The automation tool has access to a library with a plurality of predefined basic object types associated with a functionality of a technical process. The automation tool has a first functionality to generate and interlink instances of the basic object types and a second functionality to derive structural information relative to the technical process from information of each instantiated basic object type.

In addition, according to an illustrative, non-limiting formulation of the present invention, a method for supporting the planning and implementation of an automated technical process is provided. The method uses an automation tool that has access to a library with a plurality of predefined basic object types. The plurality of predefined basic object types are associated with a functionality of a technical process. Instances of the basic object types are generated by the automation tool and are suitably interlinked as required by the technical process. The automation tool derives structural information relative to the technical process from the instantiated basic object types. To derive the structural information, the links of the instances of the basic object types can, in addition, be evaluated relative to each other.

The exemplary formulations are based on the recognition that prior to an automated production of a product, a substantial amount of time and effort must be spent to set up the automated technical production process.

According to the exemplary, non-limiting formulations of the present invention, the use of a limited number of predefined basic object types enables a quasi-automated structure determination. The instantiation of selected basic object types and their interlinkages provides an automatically analyzable description of the technical process on specific abstraction levels. Other conceivable descriptions of the technical process—e.g., in natural language—require analysis functionalities in terms of an initially syntactic and semantic and subsequently logic analysis based on feasibility aspects, which are not yet or not yet sufficiently available today. Because each basic object type is associated with a functionality of a technical process, the represented functionality is known directly from the instantiation of such a basic object type, based namely on the type information of the corresponding instance or the underlying basic object type, and no further analyses are required. By interlinking individual instances of basic object types, their operative relationship is also established. All of the available basic object types are compiled in a library in a manner known per se, to which the automation tool has access. An instance of a basic object type or an instantiated basic object type is hereinafter referred to as object for short.

Preferably in the illustrative formulation, the structural information provided includes first structural information relative to the starting materials or materials processed in the technical process and the equipment to receive and transport the materials. In addition, the structural information includes second structural information, which is related to the controllability of this equipment.

Accordingly, to an illustrative formulation, the first structural information is derived, e.g., from the basic object types instantiated by the technologist. If the technologist creates two instances of a basic object type to represent a liquid starting material, the structural information that can be derived therefrom is that at least one container is required for each liquid starting material. If the technologist further creates an instance of a basic object type to represent the process-related action of mixing, the additional structural information that can be derived therefrom is that a suitable container is likewise required to perform the action of mixing. If the technologist combines or links the two objects representing the starting materials with the object representing the action of mixing, this results in the additional structural information that the two liquid starting materials are to be mixed together. Finally, if the technologist specifies an additional object to represent the process-related action of heating in the link between an object representing a starting material and the object representing the process-related action of mixing, this results in the further structural information that one of the starting materials is to be heated before mixing.

According to another exemplary, non-limiting formulation, the second structural information is derived from the basic object types instantiated by the designer or automatically by the automation tool itself. If the designer assigns a valve, screw, etc. to a container in which the starting material is stored and from which it is to be dispensed in a controlled manner, the resulting structural information is that, e.g., together with such a valve, a controllable device is provided which is assigned two process states (opened, closed) and that such a device can be controlled in two ways (open, close).

Preferably, the exemplary basic object types contained in the library are first basic object types which can be instantiated before the first structural information is derived, second basic object types, which can be instantiated before the second structural information is derived and third basic object types which can be instantiated after the second structural information has been derived.

Accordingly, a structural separation between the available basic object types is provided. The technologist uses the first basic object types to derive the first structural information. The designer builds on these first basic object types and possibly automatically generated instances of the second basic object types for the further description of the technical process using the second basic object types, thereby deriving the second structural information. The automation specialist builds on these second basic object types and possibly automatically generated instances of the third basic object types for the another description of the technical process using the third basic object types.

Preferably, in accordance with one of the illustrative, non-limiting formulations of the present invention, for each instantiated basic object type, a number of attributes predefined by the respective basic object type can be provided with a value and a representation format as needed. These attributes make it easier, e.g., to distinguish otherwise identical instances of the same basic object type. For example, if a plain language label, e.g., "valve mixer bottom," etc., is specified in an attribute provided for labeling, this instance of the object is easily distinguishable.

Furthermore, the attributes may include material characteristics of a starting material, or dimensions of a container for storing a starting material, or states or control modules for a controllable device, e.g., a valve, may be specified on such a device as an attribute. Through the permanent assignment of such attributes to the respective instance of a basic object type, the assignment of data to the respective element of the technical process—be it a starting material, a container, a valve, etc.—is preserved at all times. Each attribute can be assigned a representation format, such that, e.g., numeric values are displayed with two or four decimal places or in decimal or hexadecimal notation.

Preferably, a selection and instantiation of the first, second and third basic object types and their interlinkage is made in a first, second and third view, respectively. A view is a representation on the display unit, i.e., on the screen, for example. Thus, each specialist can be provided with his own view, an individual representation, to use the automation tool. In such an individual view, the technologist, for example, cannot see basic object types for the selection and instantation that would normally be used only by the designer or the automation specialist. According to the illustrative, non-limiting formulation, each specialist is provided with a clear working environment, which is limited to the details that this particular specialist requires to perform his or her tasks.

If selection of a representation format also defines the visibility of an attribute in the first, second or third view, a display, or the suppression of a display can be controlled in a simple manner, e.g., by a masking operation.

BRIEF DESCRIPTION OF THE DRAWINGS

The present invention will now be described in detail by describing illustrative, non-limiting embodiments thereof with reference to the accompanying drawings. In the drawings, the same reference characters denote analogous elements.

DETAILED DESCRIPTION OF ILLUSTRATIVE, NON-LIMITING EMBODIMENTS

In describing illustrative, non-limiting embodiments of the present invention, a design of a technical process in gas concrete mixing plant will be used. This technical process is provided by way of an example only, and the exemplary, non-limiting embodiments can be used with a variety of other technical processes.

Figure 1:
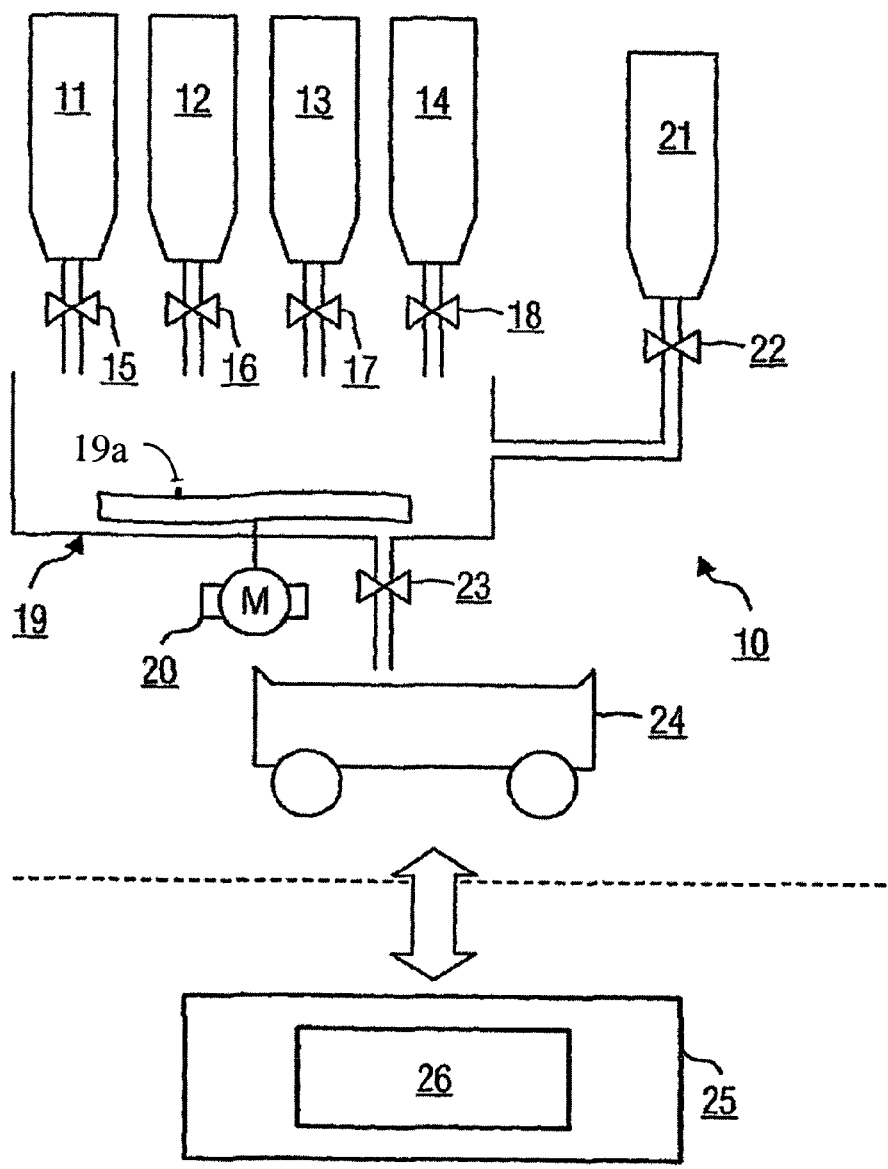
FIG. 1 is a schematic representation of a technical process according to an exemplary, non-limiting embodiment of the present invention.

FIG. 1 illustrates this exemplary technical process 10 using a schematically depicted gas concrete mixing plant. The technical process 10 includes a cement container 11, a lime container 12, a sand slurry container 13, and a water container 14 to hold the essential starting materials for the production of the gas concrete. FIG. 1 illustrates that each starting material can be dispensed by controlling a valve 15, 16, 17, and 18. Each valve 15, 16, 17, and 18 is associated with a respective container 11, 12, 13, and 14.

As illustrated in FIG. 1, the starting materials from their respective containers 11, 12, 13, and 14 then reach a mixer 19 with a mixer motor 20. These motor drives a mixer blade 19a is disposed at the bottom of the mixer 19. The starting materials from their respective containers 11, 12, 13, and 14 in the mixer 19 are mixed by operating the mixer motor 20.

Another starting material illustrated in FIG. 1 is aluminum. The aluminum is kept in an aluminum container 21 and is dispensed into the mixer 19 by controlling the valve 22 arranged on the aluminum container. The aluminum from the aluminum container 21 is dispensed into the mixer 19 just before the end of the mixing process in the mixer 19. After completion of the mixing process, a mixer bottom valve 23 is opened so that the mixed starting materials pour into a mold 24 where they swell due to the exothermal reaction of the starting material lime and essentially influenced by the chemical reaction of the starting material aluminum from the container 21 and ultimately produce the well-known porous structure of gas concrete.

The technical process 10 can be controlled and/or monitored in a known manner by a controller 25. The controller 25 is, for example, a single programmable controller, a single process computer, a single decentralized peripheral device, etc., or a combination of such devices, which are interlinked via a field bus, for example. The controller 25 controls and/or monitors the technical process 10 as specified by a control program 26, which is stored in a known manner in a memory (not depicted) of the controller 25.

The exemplary technical process 10 roughly outlined above will now be used as an example to describe an automation tool 27 according to an exemplary, non-limiting embodiment of the present invention. The exemplary automation tool 27 illustrated in FIG. 2 supports the planning and implementation of an automated technical processes such as the technical process 10, described above. In addition, with reference to FIG. 2, the exemplary method for supporting the planning and implementation of an automated technical process such as the technical process 10, which uses the automation tool 27, is described. The technical process 10, as shown in FIG. 1, is the resulting technical process rather than the starting point of such planning and implementation of the technical process.

The starting point of planning and implementing a technical process such as the technical process 10, is rather the special expertise of a technologist who knows what starting materials are required to produce gas concrete and how these starting materials must be handled. Based on his or her knowledge, the technologist prepares a description of the technical process on a first abstraction level.

Based on this first abstraction level description, a designer concretizes the information provided by the technologist relative to the equipment and devices to be used, e.g., containers, pipelines, valves, etc. The result is a description of the technical process on a next higher abstraction level, in this example, on a second abstraction level.

Based on this higher abstraction level, e.g., second abstraction level, description, an automation technologist concretizes the information available thus far in relation to the control functionalities to be used. The automation technologist provides control logic for the materials and equipment in the technical process. For simplicity, the technologist, the designer, the automation technologist, and any other technologists and/or designers involved in the process of planning and implementing a technical process are commonly referred to as "specialists".

The actions of the specialists in planning and implementing and/or producing the technical process will now be described in greater detail using the exemplary technical process 10 of the gas concrete production illustrated in FIG. 1. As mentioned above, the technical process 10 of the gas concrete production is provided by way of a non-limiting example only. The exemplary automation tool 27, illustrated in FIG. 2, can be used to plan and produce any other technical process.

Figure 2:
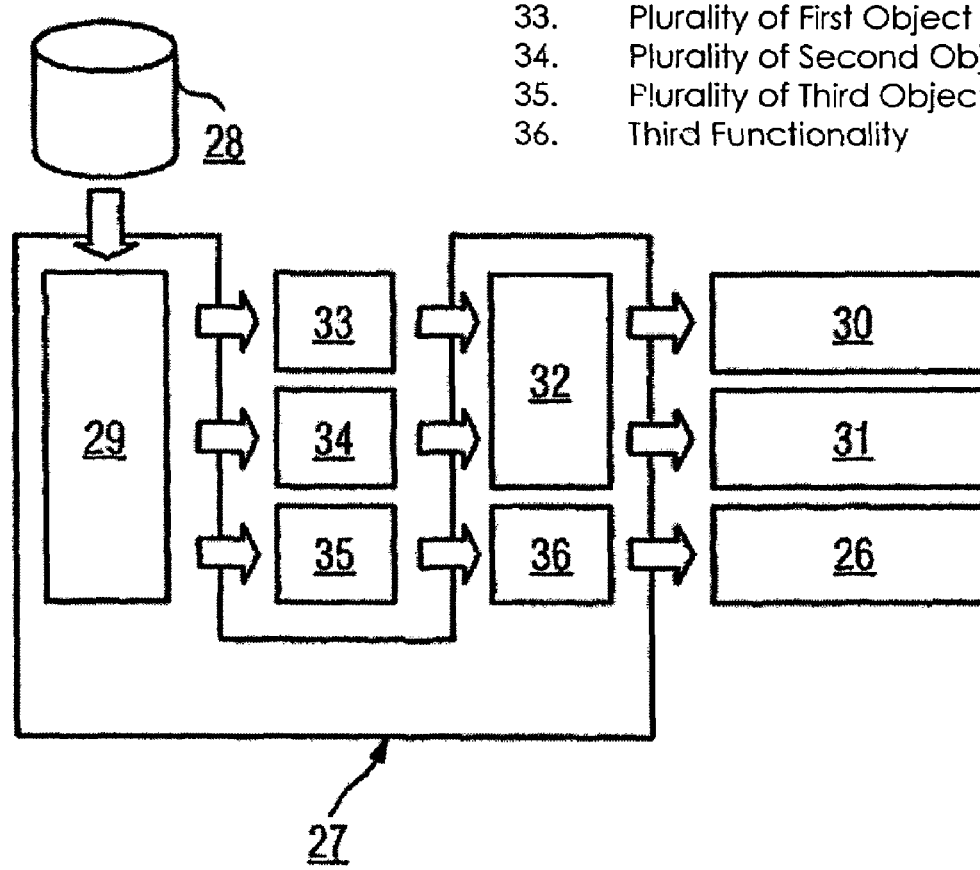
FIG. 2 is a schematic representation of an automation tool according to the exemplary, non-limiting embodiment of the present invention.

FIG. 2 shows the content of a memory (not depicted) of a known automation device. An automation device can be a programming device, a personal computer, a process computer, possibly even a programmable controller, etc. The automation tool 27 is stored in the memory of this device as a software program. The automation tool 27 accesses a library 28 in a known manner, which contains a plurality of predefined basic object types. For example, in the depicted exemplary embodiment, the access library 28 has a first basic object type 38-42 (illustrated in FIG. 3); a second basic object type 59-63 (illustrated in FIGS. 4 and 5); and a third basic object type 90-94 (illustrated in FIG. 6). These basic object types are associated with a functionality of the technical process. To instantiate, i.e., to generate and interlink instances of the basic object types 38-42; 59-63; and 90-94, the automation tool 27 has a first functionality 29. To derive structural information 30 and 31 from type information of each instantiated basic object type 38-42; 59-63; 90-94, a second functionality 32 is provided.

From a first instantiation of a plurality 33 of first basic object types 38-42, structural information in the form of first structural information 30 is derived. For example, the structural information 30 relates to the starting materials and/or materials processed in the technical process 10 and the equipment required to store and transport them. In addition, a plurality 34 of second basic object types 59-63 is instantiated. From this second instantiation of a plurality 34 of the second basic object types 59-63, structural information in the form of the second structural information 31 is derived. For example, the structural information 31 relates to the controllability of such equipment using the controller 25.

Finally, a plurality 35 of third basic object types 90-94 is instantiated. From the instances of these third basic object types 90-94, the control program 26 is derived. The derived control program 26 is transferred to the controller 25 to control and/or monitor the technical process 10. The control program 26 is derived using a third functionality 36 of the automation tool 27. The third functionality 36 extracts respective data, e.g., data representing process inputs and outputs and data representing programs or program fragments, from the instances of the third basic object types 90-94 and combines these instances in a form of the respective control program 26.

In addition, the automation tool 27 includes known functionalities (not depicted) for operating a display unit, e.g., a screen (not depicted). The automation tool 27 further has a functionality for displaying instantiated basic object types 38-42; 59-63; 90-94 on the display device and a functionality for operating input devices (not depicted), e.g., a keyboard and/or a mouse, etc.

The individual functionalities 29, 32, and 36 of the automation tool 27, such as the first functionality 29 for selecting and instantiating a specific basic object type are known. The functionality for interlinking instances of the basic object types can be implemented in a similar manner. This is known, e.g., from development environments for generating programs in sequential function chart representation. In sequential function chart representation, outputs of specific sequential function chart elements are also linked, for example, to inputs of other sequential function chart elements.

The second functionality 32 for deriving the structural information 30 and 31 from the respective information of the instantiated basic object types is embodied, for example, by a list (not depicted) in which the information and a reference to the newly created object is stored when each basic object type is instantiated. If such an object is subsequently deleted, the corresponding entry in the list is deleted. An updated list of the basic object types being used is, therefore, always available.

The individual functionalities 29, 32, and 36 of the automation tool 27 are preferably implemented as separate functional units in a known manner e.g., as separate modules or separate subroutines.

Figure 3:
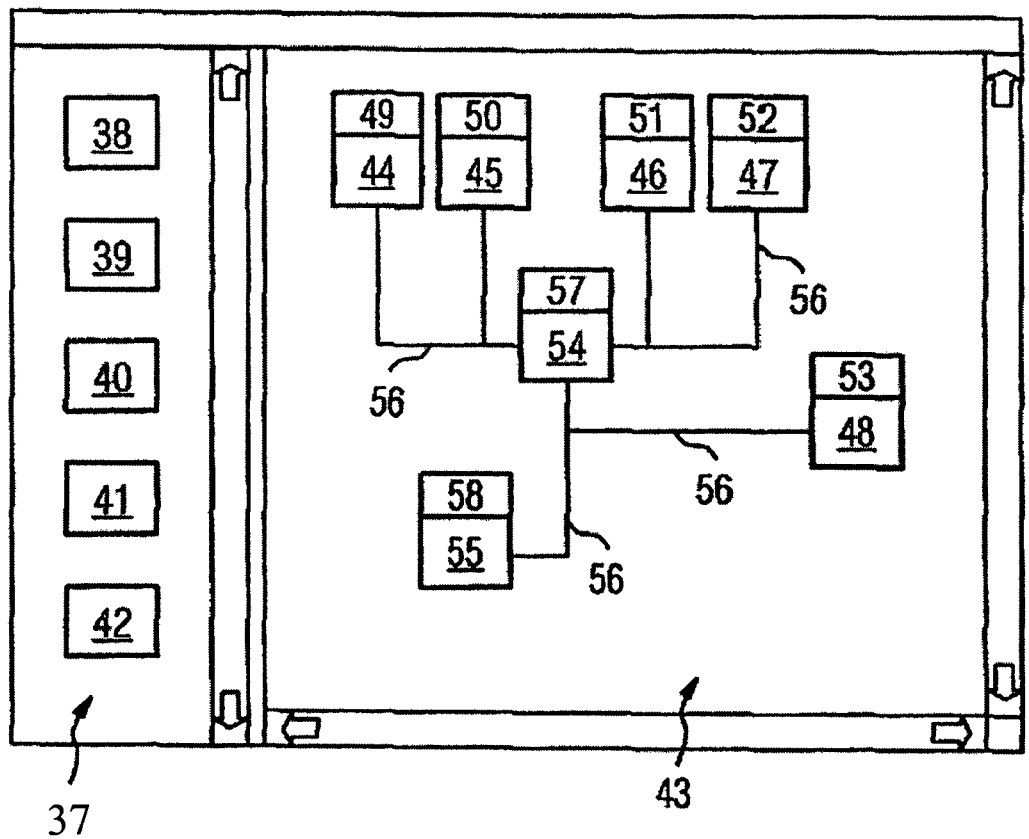
FIGS. 3 to 6 illustrate exemplary views of a screen display of the automation tool for various abstraction levels according to exemplary, non-limiting embodiments of the present invention.

FIG. 3 shows an exemplary view of the screen display of the automation tool 27 (illustrated in FIG. 2). The exemplary view, depicted in FIG. 3, illustrates a description of the technical process 10 on the first abstraction level. The screen display is based on the window technology conventionally used today. For example, as illustrated in FIG. 3, a plurality of first basic object types 38, 39, 40, 41, and 42 is offered for selection in a selection window 37. The display of individual basic object types 38-42 may also be suitably configured in a graphic form (not depicted) such that the individual basic object types can be easily distinguished from each other. To instantiate a basic object type 38-42, the desired object type is selected in the selection window 37 and transferred to a working window 43. The basic object type 38-42 is selected and transferred, for example, by clicking on the desired object and shifting it to the working window 43 (drag & drop) using a pointer device, e.g., a mouse.

The first basic object types 38-42 in the selection window 37 are each associated with a functionality of general technical processes. On the lowest abstraction level (e.g., the first abstraction level), the goal is to first represent the technical process 10 relative to the starting materials to be processed. The technologist is familiar with the required starting materials. For example, in the technical process 10 of the gas concrete production, the required starting materials are cement, lime, sand slurry, water, and aluminum (cf., FIG. 1). To represent these starting materials, the technologist instantiates the appropriate basic object types 38-42 in the working window 43.

For example, a special first basic object type 38 represents a flowable starting material, another first basic object type 39 represents a liquid starting material, yet another first object type 40 represents a powdered starting material, and first basic object types 41 and 42 represent process-related actions. These exemplary basic object types 38-42 are explained in further detail below.

To plan and implement the exemplary technical process 10 depicted in FIG. 1, the starting materials cement and lime are needed. These starting materials can be classified as flowable staring materials. The special first basic object type 38 represents the flowable starting material. Accordingly, in the working window 43, instances 44 and 45 of this special first basic object type 38 are created. These instances 44 and 45 are hereinafter also referred to as a cement object 44 and a lime object 45.

In addition, the exemplary technical process 10 depicted in FIG. 1 requires the starting materials sand slurry and water. These materials can be classified as a liquid starting material. In this exemplary embodiment, the first basic object type 39 represents the liquid starting material. Accordingly, to represent the starting materials sand slurry and water in the working window 43, instances 46 and 47 of the basic object type 39 are created. These instances 46 and 47 are hereinafter also referred to as a sand slurry object 46 and a water object 47.

Moreover, the exemplary technical process 10 depicted in FIG. 1 requires the starting material aluminum. This material can be classified as a powdered starting material. The first basic object type 40 represents the powdered starting material. Accordingly, to represent the starting material aluminum in the working window 43, an instance 48 of the basic object type 40 is created. This instance 48 is hereinafter also referred to as an aluminum object 48. For solid or gaseous starting materials, for example, other predefined basic object types are available. But since other predefined basic object types are not required for the exemplary technical process 10 of the gas concrete production, other predefined basic object types are not depicted in the FIGS.

The above described instances 44-48, each represents an instance of the respective starting material. Each of the instances 44-48 has one or more attributes. In FIG. 3, the attributes are depicted as 49, 50, 51, 52, and 53, which are permanently assigned to the respective instance 44, 45, 46, 47, and 48. Attributes 49-53, as used hereinafter, refers to a single attribute and collectively to all the attributes assigned to an object type or an instance generated therefrom.

For example, each instance may be assigned an attribute of a plain text label of the represented respective starting material, i.e., labels "cement," "lime," "sand slurry," "water," and "aluminum," are attributes 49-53, respectively. These exemplary attributes make it easier to distinguish individual instances of otherwise identical first basic object types 38-42.

Furthermore, the attributes 49-53 can contain quantity information, for example. The technologist already knows the size of the future mold 24 (depicted in FIG. 1), i.e., the volume it can hold. Depending on the formula for gas concrete of different hardness or density, specific mixing ratios of the starting materials are needed. In addition, specific quantities must be stored in the corresponding containers 11, 12, 13, 14, and 21 (also depicted in FIG. 1) to obtain a given mixture or a plurality of successive mixtures. With this information, the technologist can already assign quantities to the respective object instances 44-48, e.g., by volume or weight.

The following exemplary tabular list uses a pseudo code to provide an exemplary scope of the attributes 49-53 of the above-described instances 44-48 of the first basic object types 38, 39, and 40. Additional and/or equivalent alternative attributes are feasible:

| Reference: | pointer |
| --- | --- |
| Designation: | string |
| Quantity: | integer |

The attribute "reference" is used to assign objects created by the technologist to other objects created in subsequent abstraction levels by the designer (e.g., at the second abstraction level), the automation specialist (e.g., at a third abstraction level) and so on. Alternatively, the objects can be assigned to other objects created in subsequent abstraction levels automatically by the automation tool 27 (depicted in FIG. 2). One way to create such an assignment is to store the address of the referenced object.

The first basic object types 41 and 42, mentioned above, represent by way of an example, process-related actions, e.g., heating, cooling, mixing, etc. These process-related actions are applied to a single, several or all of the starting materials. For example, in the technical process 10 depicted in FIG. 1, since the starting materials must be mixed to produce the gas concrete, the first basic object type 41 represents the process-related action of mixing. According to the technical process 10, the starting materials are mixed twice: first, before the starting material aluminum is added, and then, the starting materials are briefly mixed with the aluminum. Consequently, the first basic object type 41 is selected and first and second instances 54 and 55 of this basic object type 41 are created in the working window 43. These instances 54 and 55 are hereinafter also referred to as the first mixing object 54 and the second mixing object 55.

The technologist knows that the starting materials cement, lime, sand slurry, and water must be mixed first and the starting material aluminum may be added only just before the mixture is filled into the mold 24 (illustrated in FIG. 1). The mixing of the starting materials cement, lime sand slurry and water requires a certain amount of time, hereinafter referred to as mixing time. If the starting material aluminum contacted the other starting materials during the entire mixing time, the desired swelling effect would already occur in the mixer 19 (illustrated in FIG. 1) rather than only in the mold 24. This is why the starting material aluminum is not added until after the mixing time has elapsed and is mixed with the other previously mixed starting materials during an additional mixing time.

To represent this schema, the cement object 44, the lime object 45, the sand slurry object 46, and the water object 47 are linked with the first mixing object 54. The aluminum object 48 and the first mixing object 54 are linked with the second mixing object 55. In the simplest case, a linkage 56 of the instances of the respective basic object types—of the objects—is illustrated by a line connection, which is created using the pointer device. The linkage 56 of the cement object 44, the lime object 45, the sand slurry object 46, and the water object 47 with the first mixing object 54 represents the mixing of these starting materials, as illustrated in FIG. 3. The linkage 56 of the first mixing object 54 and the aluminum object 48 with the second mixing object 55 represents the mixing of the previously mixed starting materials with the starting material aluminum, as also shown in FIG. 3.

Each mixing object 54 and 55 is permanently assigned one or more attributes 57 and 58, respectively. Each mixing object 54 and 55 is assigned, for example, a plain text label of the represented process-related action as an attribute 57 and 58 for its respective mixing object, i.e., "mixing" or "additional mixing." For the two mixing objects 54 and 55, it is also useful to use additional respective attributes 57 and 58 to indicate the mixing time for the respective mixing objects 54 and 55.

The following exemplary tabular list provides an exemplary scope of the attributes 57 and 58 of the fourth basic object type 41 or of each mixing object 54 and 55 instantiated therefrom. Additional and/or equivalent alternative attributes are feasible:

| Reference: | pointer |
| --- | --- |
| Designation: | string |
| Mixing time: | integer |

For basic object types representing further process-related actions, e.g., heating or cooling, respective suitable attributes are provided, e.g., to define a desired temperature or a temperature profile.

In accordance with the exemplary description above, the technologist uses the automation tool 27 to define a description of the technical process 10 on a first abstraction level. The designer uses the data provided on the first abstraction level to further describe the technical process 10 on a subsequent abstraction level, e.g., the second abstraction level.

The designer uses the description of the technical process 10 created by the technologist as a basis for designing a description of the technical process 10 on a subsequent abstraction level. When the designer uses the automation tool 27 (depicted in FIG. 2) he or she sees the information created on the first abstraction level and possibly other information, i.e., automatically generated information, displayed in a view provided for the designer. Each view of the description of the technical process 10 provided by the automation tool 27 corresponds to an abstraction level of this description.

The technologist describes the technical process 10 on a first abstraction level, e.g., relative to the required starting materials. The first view is provided to display this description. The designer describes the technical process 10 on a second abstraction level, e.g., relative to the equipment, such as containers, etc., to store and transport these starting materials. The second view is provided to display this description. Finally, the automation specialist describes the technical process 10 on a third abstraction level, e.g. relative to the controllability of such equipment by a controller. The third view is provided to display this description.

Figure 4:
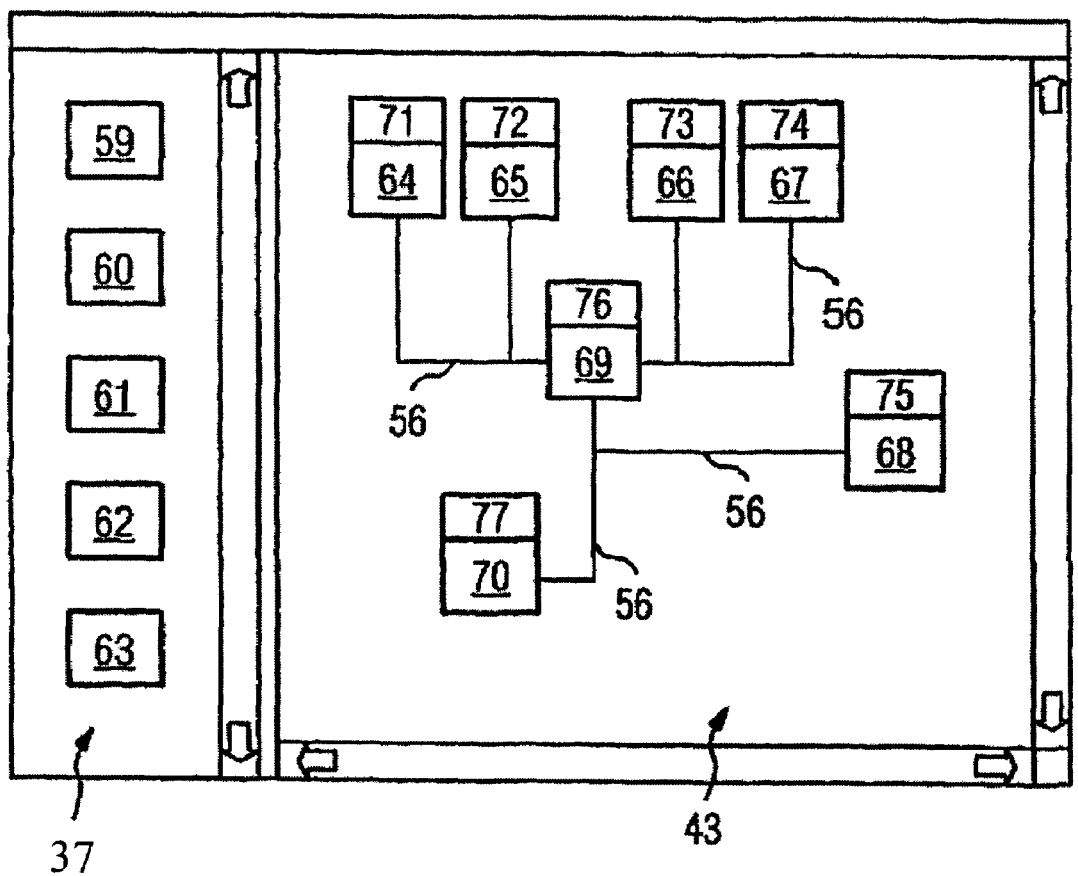

FIG. 4 shows a rough structure of the technical process 10 generated automatically by the automation tool 27 (FIG. 2) in the form presented to the designer on the abstraction level provided for the designer and in the second view corresponding to that level, e.g., second level of abstraction.

Based on the cement object 44, the lime object 45, the sand slurry object 46, the water object 47, and the aluminum object 48 (illustrated in FIG. 3), the designer—possibly supported by an appropriate graphic representation of these objects—recognizes that these are the starting materials for the technical process 10, which must be appropriately stored or stocked. The requirement to provide suitable solution to store the respective starting materials, however, can also be recognized automatically by the automation tool 27.

For example, the need to provide a suitable container for each of the flowable starting materials can be directly deduced from the fact that a cement object 44 and a lime object 45 have been created as instances of the first basic object type 38, which represents flowable starting materials. Analogously, based on the created sand slurry object 46 and water object 47, it is clear that a corresponding container must be provided for each of these liquid starting materials. The same applies to the aluminum object 48. Finally, the need to provide at least one mixing container is evident from the two mixing objects 54, 55 that have been created. In other words, it can be deduced from the instances based on the object types what equipment, e.g., a container, is necessary to carry out the technical process 10.

The automation tool 27, therefore, uses the description of the technical process 10 on the first abstraction level to automatically generate a rough structure of the technical process on a subsequent, second abstraction level. The type information of the instantiated basic object type 38-41 is taken into account in this process.

On the second abstraction level, as illustrated in FIG. 4, a plurality of second basic object types 59, 60, 61, 62, and 63 is provided in the selection window 37. The automation tool 27 thus uses the information of the technologist and accesses suitable second basic object types 59-63 to automatically generate objects 64, 65, 66, 67, and 68. Each object represents a container to store respective starting material. In addition, objects 69 and 70 are automatically generated from the second basic object types 59-63. Each of the objects 69 and 70 represents a container in which or with which each process-related action is carried out. Each object 64-70, in turn, has permanently assigned respective attributes 71, 72, 73, 74, 75, 76, and 77.

The following exemplary tabular list provides an exemplary scope of the attributes 71-77 of the objects 64-70 or of the underlying additional basic object type. Additional and/or equivalent alternative attributes are feasible:

| Reference: | pointer |
|---|---|
| Designation: | string |
| Volume: | integer |
| Length: | integer |
| Height: | integer |
| Width: | integer |
| Diameter: | integer |

The attribute "reference" makes it possible for the objects 44-48, 54, and 55 of the first basic object types 38-41 represented in the first abstraction level (cf. FIG. 3) to be assigned to the respective objects 64-70 of the second abstraction level. That is, a container is assigned to each starting material. One way to produce such an assignment is to store the address of the respectively referenced object. In fact, a cross-referencing results because objects from the first abstraction level are linked with the respective objects on the second abstraction level, which in turn are linked with the respective objects of the first abstraction level. This applies analogously to other objects on the third abstraction level. In this manner, based on each abstraction level, the respective objects are easy to find on the other abstraction levels.

The designer uses the automatically generated objects 64-70 to further concretize the description of the technical process 10. To further concretize the description of the technical process 10, the designer defines, e.g., the length, the width and the height, or the height and the diameter of each represented future container 11-14, 21 (illustrated in FIG. 1) in the attributes 71-77. When defining the values of these attributes 71-77, the designer is guided by the required minimum volume and the space available at the site. Individual values of attributes 71-77 of an object are defined, for example, by selecting the object using the pointer device in a known manner and subsequently opening a so-called contextual menu, which provides access to all or to selected or selectable attributes.

If the same container is to be used to mix the starting material aluminum with the other previously mixed starting materials, the designer deletes, e.g., the object 70 generated automatically for the second mixing object 55 (depicted in FIG. 3) and manually adjusts the reference, such that the first mixing object 54 and the second mixing object 55 (see FIG. 3) both reference the single remaining object 69 representing a mixing container.

For the starting materials cement and lime, which must be dispensed in a controlled manner, i.e., in the required quantity, from the later cement container 11 or the lime container 12 (illustrated in FIG. 1), requires a likewise controlled opening and closing of each of the later cement container 11 and the lime containers 12. To control the dispensing of the starting materials, the designer will provide controllable devices, e.g., a valve or a screw and possibly a conveyor belt or the like. By using these controllable devices, the starting materials such as the cement and the lime can be dispensed and transported in a controlled manner.

These controllable devices are assigned to each object 64-68 created to represent containers 11-14, and 21 (see FIG. 1) for storing the starting materials. For the sake of simplicity, the two objects 64 and 65 are hereinafter referred to as a cement container object 64 and a lime container object 65. The description of controlling the starting material at the designer's level is provided using these objects 64 and 65 with reference to FIG. 5. For other objects, the planning and producing process of the second abstraction level applies analogously.

Figure 5:
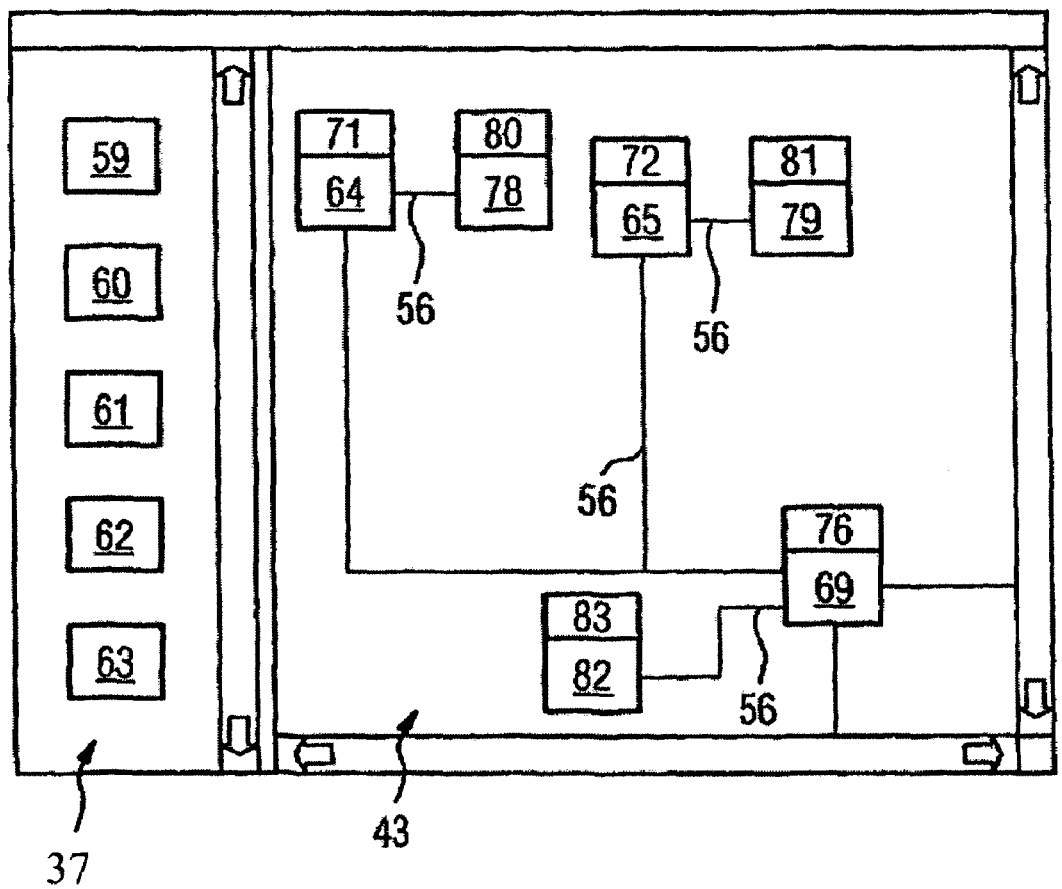

FIG. 5 shows additional detail of the display depicted in FIG. 4 in the working window 43 of the automation tool 27 (FIG. 2). The designer, in the view of the automation tool 27 on the second level of abstraction, is provided with second basic object types 59-63 to represent, e.g., devices such as the ones mentioned above with reference to FIG. 4.

By way of an example, a special second basic object type 59 represents a valve. Valves 15 and 16 (illustrated in FIG. 1) are suitable to dispense the starting materials in a controlled manner, i.e., cement and lime, respectively, from the respective containers 11 and 12 (shown in FIG. 1). The designer, therefore, creates two instances 78 and 79 of the special second basic object type 59 and assigns these instances, respectively, to the cement container object 64 and the lime container object 65 by providing respective links 56.

The two instances 78 and 79 of the special second basic object type 59 are hereinafter also referred to as valve objects 78 and 79. Each valve object 78, 79 has its own permanently assigned respective attributes 80 and 81. Using the attributes 80 and 81, each valve object 78 and 79 can be assigned a plain text label, e.g., "valve cement container outlet" or "valve lime container outlet" to make it easier to distinguish them.

Furthermore, by way of an example, each valve illustrated in FIG. 1 can assume three states, i.e., "opened," "closed" and "neither opened nor closed." The special second basic object type 59 and, respective instances of valve object 78 and 79 include Boolean type attributes. In particular, each instance 78 and 79 of the valve object include respective attributes 80 and 81, e.g., each instance has an "opened" attribute and a "closed" attribute to represent these states. If the attribute "opened" assumes the value "true", then the valve is open. If the attribute "closed" assumes the value "true", then the valve is closed. If both attributes "opened" and "closed" assume the value "false", then the valve is partially opened or partially closed. Alternatively, the valve had not yet fully opened or fully closed. To represent a way to control a valve, the valve object instances 78 and 79, or the underlying special second basic object type 59 has other respective attributes 80 and 81, e.g., "open" and "close."

The following exemplary tabular list provides an exemplary scope of the attributes 80 and 81 of the valve object instances 78 and 79, or the underlying special second basic object type 59. Additional and/or equivalent alternative attributes are feasible:

| Reference: | pointer |
|---|---|
| Designation: | string |
| Opened: | Boolean |
| Closed: | Boolean |
| Open: | Boolean |
| Close: | Boolean |

To mix the starting materials in the mixer 19 (illustrated in FIG. 1), a motor 20 (FIG. 1) is required to drive the mixer blade 19a. To represent this action of the motor 20, the object 69 representing the mixing container is assigned a motor object 82, e.g., as an instance of an additional second basic object type 60. The later motor 20 thus represented can be switched on or off. An attribute 83, e.g., "operation," is provided to represent the two possible states of the motor.

The following exemplary tabular list provides an exemplary scope of the attributes 83 of the motor object 82, or the underlying additional second basic object type 60. Additional and/or equivalent alternative attributes are feasible:

| Reference: | pointer |
|---|---|
| Designation: | string |
| Operation: | Boolean |

The designer supplements the description of the technical process 10 as needed by representations of additional devices, such as valves, etc. For example, the monitoring of a filling level can be implemented by using a limit value indicator. To represent the limit value indicator, the designer creates objects of a corresponding second basic object type 59-63 and appropriately assigns them to other objects, e.g., the cement container object 64 or the lime container object 65. Similar procedure is followed for other devices not specified here. In addition, the designer also at least in part defines, e.g., limit switches or control elements. To define the control elements, the designer provides suitable objects to represent the desired control elements and limit switched.

In this manner, the designer uses the automation tool 27 to define a description of the technical process 10 on the second abstraction level. The automation specialist uses the data thus available for the further description of the technical process 10 on the third abstraction level.

The automation specialist uses the description of the technical process 10 created by the designer as a basis for the next abstraction level. When using the automation tool 27, the automation specialist sees in the view provided for this abstraction level, e.g., the third abstraction level, the information created by the specialist and the designer, and possibly additional, automatically generated information by the automation tool 27. The objects 78, 79, and 82 created by the designer together with their respective attributes 80, 81, and 83 already make up a major part of the states of the later controlled and/or monitored technical process 10, e.g., "valve opened" or "motor ON." They also include control modules for the controllable devices in the technical process 10, e.g., "close valve" or "motor OFF." Thus, based on the description of the technical process created by the designer, the automation tool 27 can automatically generate the so-called process image, including the process image of the inputs (e.g., "lime container valve closed," etc.) and the process image of the outputs (e.g., "mixer motor OFF," etc.)

In a view of the automation tool 27 provided for the automation specialist, the automation specialist defines additional objects required to represent, e.g., control devices or switching devices, and the assignment of the individual process states to physical inputs and outputs of the later control hardware, e.g., a programmable controller. The automation specialist further defines a link, e.g., between the process states and internal states. This is explained below with reference to FIG. 6.

Figure 6:
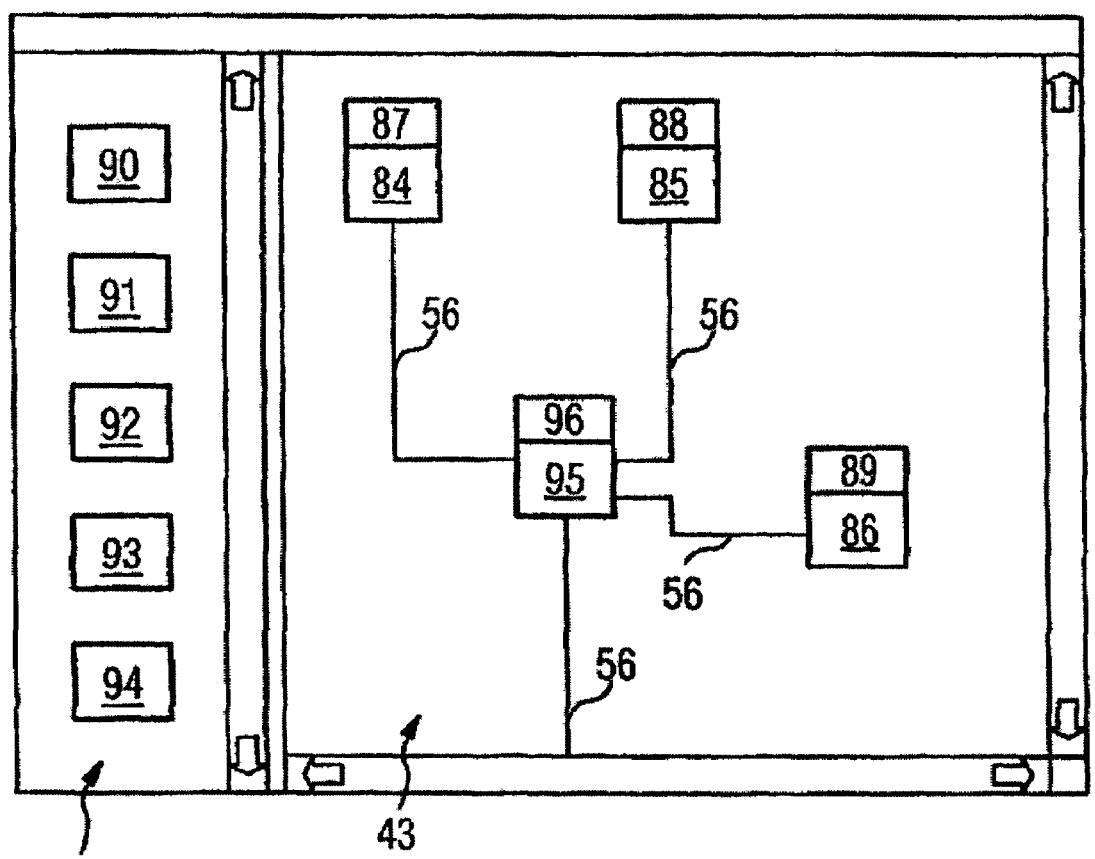

FIG. 6 shows a rough structure of the technical process 10 generated by the automation tool 27 (illustrated in FIG. 2) as it is presented to the automation specialist on the abstraction level provided for the automation specialist, e.g., third abstraction level. This rough structure includes a first and a second valve control objects 84 and 85 and a motor control object 86, each with associated respective attributes 87, 88, and 89. These objects 84-86 are either instances of third basic object types 90-94 available to the automation specialist in the view reserved for the third abstraction level or another appropriate representation of the valve objects 78 and 79 and/or the motor object 82 (illustrated in FIG. 5) based on the view reserved for the automation specialist. When the third basic object types 90-94 are available for the automation specialist, the automation tool 27 generates the additional objects. On the other hand, when an appropriate representation of the objects is provided, the automation tool 27 generates the appropriate representation.

The automation specialist concretizes the rough structure by creating, e.g., an automation object 95 to represent, e.g., a programmable controller or a decentralized peripheral device, jointly referred to as a controller, as an instance of an appropriate third basic object type from the third basic object types 90-94. This controller controls the technical process 10 as defined in an application program by reading process states as process inputs and setting or resetting process outputs as a function of these process states and other internal states, e.g., to switch a motor on or off.

The links 56 between the individual objects 84, 85, and 86 and the automation object 95 indicate which objects (e.g., objects 84, 85, and 86) are controlled by the automation object 95 and thereby determine which specific devices, e.g., valves, etc., are controlled in the technical process by the controller represented by the automation object 95. The automation object 95 includes, as attribute 96, at least the process image of the inputs, the process image of the outputs, and a marker memory area to temporarily store internal states. With the link 56 between the automation object 95 and the other objects 84, 85, and 86, the automation tool 27 can automatically generate the process image of the inputs and the process image of the outputs for the automation object 95 using the states and the control modules assigned to these objects 84, 85, and 86 by their respective attributes 87, 88, and 89.

By opening, e.g., a contextual menu assigned to the attribute 96 of the automation object 95, the automation specialist assigns physical addresses to the individual states and the control modules. The physical addresses correspond to the arrangement of a subsequent control operations of the technical process. This assignment can also already occur relative to the attributes 87, 88, and 89 of the valve control objects 84 and 85, and the motor control object 86. In this case, not only the states and the control modules but also the assignments that had been made are automatically transferred to the attribute 96 of the automation object 95.

The automation specialist now plans the control program 26 (illustrated in FIG. 2) and to produce this control program 26 defines internal states, e.g., "automatic operation" and "fill mixer." These internal states are represented as markers in a known manner. Using these or similar internal states and also "real" process inputs and outputs, individual elements of the control program 26 can now be successively created. If in the later operation of the technical process the internal state "fill mixer" is present, then the respective starting materials must be dispensed from the respective containers 11-14 and 21 into the mixer 19 (these elements are illustrated in FIG. 1).

In a section of the attribute 87 and 88 of the two valve control objects 84 and 85 provided to dispense the starting materials, a respective program instruction is stored, which has, e.g., the following format in a pseudo code: "IF [automatic] AND [fill mixer] THEN [open valve]." "Automatic" and "fill mixer" are global variables, which are valid for the automation object 95 and the objects 84, 85, and 86 controlled thereby. "Open valve" is an attribute 87 and 88 of the respective valve control objects 84 and 85 but is also a process output and thus controls the valves 15 and 16 (FIG. 1).

If subsequently, e.g., at a time when the planning of the technical process has already made some progress, the technologist wants to add an additional starting material, e.g., a first and second type of lime instead of only a single type of lime, the technologist instantiates the respective objects in the view reserved for the technologist.

These changes are immediately visible for the designer in his or her respective view, because the automation tool 27 automatically generates, e.g., an additional object to represent a container to receive an additional type of lime. The designer takes this into account by assigning this container a valve for the controlled dispensing of a newly added starting material. This additional valve automatically appears in the view reserved for the automation specialist. The automation specialist links the new object with an automation object, which immediately causes a respective adjustment of the process image of the inputs and outputs, since each additional valve results in two additional process inputs ("valve opened," and "valve closed") and two additional process outputs ("open valve," "close valve"). To control these process inputs and outputs, the automation specialist provides appropriate program instructions in the new object.

If, for example, based on the description of a previously implemented technical process, a starting material is omitted—e.g., instead of the previously described three types of starting materials (cement, lime, and sand slurry), only a single type of this starting material is provided—the technologist can delete the representation of the two starting materials that are not required. As a result, the assigned valves are immediately deleted in the view reserved for the designer and the process states, the control modules and associated program codes are deleted in the view reserved for the automation specialist.

In addition, an object used or created on one abstraction level and an object assigned on a different abstraction level do not necessarily have to be instances of different object types. It may, in fact, be provided that an object of a single suitable basic object type is instantiated, e.g., to represent a liquid starting material and to represent a container to store such a liquid starting material. If this instantiated object is used the automation tool 27 displays only an appropriate portion of the data of this object in the different views.

For example, the view reserved for the technologist displays data relating to the type and amount of the starting material, while the view reserved for the designer displays data on the dimensions of the container. In fact, the definition of the usable basic object types determines whether, for an object in a first view/on a first abstraction level, a respective additional object is automatically generated on a subsequent abstraction level, or whether the available basic object types already include all the data of otherwise automatically generated, additional objects, such that only specified or default data are displayed on a subsequent abstraction level/in a subsequent view. The automation tool 27 has functionality to define user-specific basic object types, or to expand or adapt existing basic object types.

The exemplary automation tool 27 and a method for supporting the planning and implementation of the automated technical process 10 is provided with access to a library containing a plurality of predefined basic object types 38-42; 59-63; 90-94 associated with a functionality of the technical process 10. The automation tool 27 offers a functionality to generate and interlink instances of the basic object types 38-42; 59-63; 90-94 and a functionality to derive structural information relative to the technical process 10 from the type information of each instantiated basic object type 38-42; 59-63; 90-94.

The exemplary automation tool 27 supports the process of planning and implementing the technical process 10 throughout. Planning and implementation are divided into three abstraction levels, for example. For each abstraction level, the automation tool 27 provides a view. On each abstraction level/in each view, a specialist—first a technologist, then a designer, and finally an automation specialist—describes the technical process 10. Each specialist creates a plurality of objects in the view provided for that specialist as instances of first, second or third basic object types 38-42; 59-63; 90-94 and interlinks the created instances as required by the technical process 10.

Each basic object type 38-42; 59-63; 90-94 is associated with a functionality of the technical process 10. For example, one basic object type 38-42; 59-63; 90-94 is provided to represent a starting material, another basic object type 38-42; 59-63; 90-94 to represent a container to store the respective starting material, another basic object type 38-42; 59-63; 90-94 to represent a valve, a screw, etc., another basic object type 38-42; 59-63; 90-94 to represent a valve control or a motor control, and yet another basic object type 38-42; 59-63; 90-94 to represent a controller.

Accordingly, a complete description of the technical process 10 in technological respects (first abstraction level), in structural and mechanical engineering respects (second abstraction level), and in automation engineering respects (third abstraction level), is provided. A material flow diagram, structural data, and a control program 26 can be derived from these data. The control program 26 can be transferred with few or no changes directly to a controller to control and/or monitor the technical process. The tight interlinking of the description of the individual abstraction levels makes it possible to introduce adjustments or changes in a simple and transparent manner.

The above description of illustrative, non-limiting embodiments has been given by way of an example. The above and other features of the invention including various novel method steps and a device of the various novel components have been particularly described with reference to the accompanying drawings and pointed out in the claims. It will be understood that the particular process and construction of parts embodying the invention is shown by way of an illustration only and not as a limitation of the invention. The principles and features of this invention may be employed in varied and numerous embodiments without departing from the scope of the invention as defined by the appended claims and equivalents thereof.

What is claimed is:

1. A computer readable medium storing an automation tool for supporting the planning and implementation of an automated technical process, the automation tool comprising:
   an access to a library containing a plurality of predefined basic object types associated with a functionality of a technical process, wherein the library contains, as the basic object types, a hierarchy of object types, comprising:
      first basic object types which is a highest level of abstraction and such that instances of the first basic object types represent physical starting material or physical raw substances to be processed in the technical process and to physical equipment for picking and transporting the starting materials to be used in the technical process,
      second basic object types such that instances of the second basic object types represent functional relationship to the equipment to be used in the technical process for picking up and transporting the starting material, and
      third basic object types such that instances of the third basic object types represent a control program for a controller for controlling the technical process;
   a first functionality generating and interlinking instances of the basic object types;
   a second functionality deriving structural information relative to the technical process from type information of each of the instantiated basic object types; and
   a display functionality outputting each of the generated instances of the first, second, and third object types onto a respective view,
   wherein first structure information relating to the staffing material and equipment is derived from instances of the first basic object type,
   wherein instances of the second basic object type are generated from the first structure information,
   wherein second structure information related to influence on the equipment is derived from the generated instances of the second basic object type,
   wherein the display functionality generates a first view in which a first specialist selects from a first selection window displayed in the first view at least one of the first basic object types and a corresponding instance is generated by the first functionality and is displayed in a first working window in the first view, where the first view displays only the first basic object types, and
   wherein the display functionality generates a second view in which a second specialist selects from a second selection window displayed in the second view at least one of the second basic object types to modify the technical process and a corresponding instance is generated by the first functionality and is displayed in a second working window in the second view, where the second view displays only the second basic object types and the second working window displays at least one instance of the second basic object types automatically generated and interlinked by the automation tool based on the selected first object types displayed in first working window.

2. The computer readable medium as claimed in claim 1, wherein the library contains, as the basic object types, the first basic object types which can be instantiated before deriving the first structural information, the second basic object types which can be instantiated before deriving the second structural information, and the third basic object types which can be instantiated after deriving the second structural information.

3. The computer readable medium according to claim 1, wherein the display functionality generates a third view for a third specialist, the third view comprises only the third basic object types and displays controlling of the technical process in a third working window and wherein the third specialist modifies the technical process displayed in the third working window by deleting at least one instance of the third basic object types displayed in the third working window or by selecting from a third selection window displayed in the third view at least one of the third basic object types and a corresponding instance is generated by the first functionality and is displayed in a third working window in the third view, where the third view displays only the third basic object types.

4. The computer readable medium according to claim 3, wherein the first specialist is a designer and the first view is dedicated to the designer, wherein a third specialist is an automation specialist and the third view is dedicated to the automation specialist, and wherein changes in one of the first, second, and third working windows are automatically applied to the other two working windows.

5. The computer readable medium according to claim 1, wherein the hierarchy of the object types is a layering of the object types and wherein the first basic object types is highest level of abstraction, and wherein based on the first structure information, the generated instances of the second object type have attributes comprising dimensions of the equipment.

6. A method for supporting computerized planning and implementation of an automated technical process using a computerized automation tool which has access to a library containing a plurality of predefined basic object types associated with a functionality of a technical process, the method comprising:
   generating instances of the basic object types via the automation tool, where the library contains, as the basic object types, a hierarchy of object types, comprising:
   first basic object types which is a highest level of abstraction and such that instances of the first basic object types represent physical starting material or physical raw substances to be processed in the technical process and physical equipment for picking up and transporting the starting material, second basic object types such that instances of the second basic object types represent influences to the equipment for picking up and transporting the starting material, and third basic object types such that instances of the third basic object types represent a control program for a controller for controlling the technical process;

interlinking the generated instances in accordance with requirements of the technical process via the automation tool;

deriving, via the automation tool, structural information relative to the technical process from the instantiated basic object types; and outputting on a display each of the generated instances of the first, second, and third object types onto a respective separate view, wherein first structure information relating to the staffing material and equipment is derived from instances of the first basic object type, wherein instances of the second basic object type are generated from the first structure information, wherein second structure information related to influence on the equipment is derived from the generated instances of the second basic object type, wherein said outputting comprises generating a first view in which a first specialist selects from a first selection window displayed in the first view at least one of the first basic object types and a corresponding instance is generated by the first functionality and is display in a first working window in the first view, where the first view displays only the first basic object types, and wherein said outputting comprises generating a second view in which a second specialist selects from a second selection window displayed in the second view at least one of the second basic object types to modify the technical process and a corresponding instance is generated by the first functionality and is displayed in a second working window in the second view, where the second view displays only the second basic object types and the second working window displays at least one instance of the second basic object types automatically generated and interlinked by the automation tool based on the selected first object types displayed in first working window.

7. The method as claimed in claim 6, wherein the instantiated basic object types include the interlinkages of the generated basic instances.

8. The method as claimed in claim 6, wherein for each of the instantiated basic object types, a number of attributes, predefined by a respective one of the initiated basic object types, are provided with at least one of a required value and a required representation format.

9. The method as claimed in claim 8, wherein the basic object types comprise the first basic object types, which are available for instantiation before deriving the first structural information, the second basic object types, which are available for instantiation before deriving the second structural information, and the third basic object types, which are available for instantiation after deriving the second structural information.

10. The method as claimed in claim 9, wherein the first, the second, and the third basic object types are selected, instantiated and interlinked only in a first, a second and a third view, respectively.

11. The method as claimed in claim 10, wherein, in at least one of the first, the second, and the third view, a format of the view defines visibility of an attribute.

12. The method as claimed in claim 8, wherein:
a plurality of the third basic object types is instantiated for the second structural information so that at least one automation object is created,
the automation object relates to a control program controlling at least a portion of the technical process, and
an attribute of the automation object comprises a process image of inputs of the technical process and a process image of outputs of the technical process.

13. The method as claimed in claim 12, wherein the process image of the inputs and the process image of the outputs are determined by attributes of the third basic object types.

14. The method as claimed in claim 13, wherein each instance of the third basic object types is assigned a program code in attribute of the respective instance to control a device represented by the respective instance.

15. The method as claimed in claim 12, wherein each instance of the third basic object types is assigned a program code in the attribute of the respective instance to control a device represented by the respective instance.

16. The method as claimed in claim 6, wherein the basic object types comprise the first basic object types, which are available for instantiation before deriving the first structural information, the second basic object types, which are available for instantiation before deriving the second structural information, and the third basic object types, which are available for instantiation after deriving the second structural information.

17. The method as claimed in claim 16, wherein the first, the second, and the third basic object types are selected, instantiated and interlinked in a first, a second and a third view, respectively.

18. The method as claimed in claim 6, wherein:
a plurality of the third basic object types is instantiated for the second structural information so that at least one automation object is created,
the automation object relates to a control program controlling at least a portion of the technical process, and
an attribute of the automation object comprises a process image of inputs of the technical process and a process image of outputs of the technical process.

19. The method as claimed in claim 18, wherein the process image of the inputs and the process image of the outputs are determined by attributes of the third basic object types.

20. The method as claimed in claim 19, wherein each instance of the third basic object types is assigned a program code in the attribute of the respective instance to control a device represented by the respective instance.

21. The method as claimed in claim 18, wherein each instance of the third basic object types is assigned a program code in the attribute of the respective instance to control a device represented by the respective instance.

22. The method as claimed in claim 6, wherein the third basic object types are available for instantiation after deriving the second structural information.

23. The method as claimed in claim 22, wherein the first, the second, and the third basic object types are selected, instantiated and interlinked in a first, a second and a third view, respectively.

24. A computer readable medium storing an automation tool for supporting planning and implementation of an automated technical process, the automation tool comprising:
an accessor accessing a plurality of predefined basic object types associated with a functionality of a technical process;
a first functionality generating and interlinking instances of the basic object types; and a second functionality deriving structural information relative to the technical process from information of each of the instantiated basic object types; and a third functionality for generating a control program based on the derived structural information; and display functionality for displaying the derived structural information, wherein the derived structural information is shared between a design of a flow diagram of the technical process displayed in a first view, structural data of the technical process displayed in a second view, and a control program controlling the technical process generated by the automation tool and transmitted to a controller, wherein the first, second, and third views are displayed separately with respective, unique basic object types such that each view is specifically designed for a different type of engineers, wherein first structure information relating to physical starting material and physical equipment is derived from instances of first basic object type, wherein instances of second basic object type are generated from the first structure information, and where the second basic object type represents functional relationship to the equipment to be used in the technical process for picking up and transporting the starting material, wherein instances of the second basic object type are generated from the first structure information, wherein second structure information related to influence on the equipment is derived from the generated instances of the second basic object type, wherein the display functionality generates a first view in which a first specialist selects from a first selection window displayed in the first view at least one of the first basic object types and a corresponding instance is generated by the first functionality and is displayed in a first working window in the first view, where the first view displays only the first basic object types, and wherein the display functionality generates a second view in which a second specialist selects from a second selection window displayed in the second view at least one of the second basic object types to modify the technical process and a corresponding instance is generated by the first functionality and is displayed in a second working window in the second view, where the second view displays only the second basic object types and the second working window displays at least one instance of the second basic object types automatically generated and interlinked by the automation tool based on the selected first object types displayed in first working window.

25. The computer readable medium as claimed in claim 24, wherein the plurality of predefined basic object types comprises the first basic object types relating to process materials and equipment of the technical process, the second basic object types relating to actions and states in the technical process, and the third basic object types relating to instructions to control the technical process, and wherein the actions in the technical process comprise manipulation of at least one of the process materials and the equipment, and the states comprise a state of at least one of the process materials and the equipment.

26. The computer readable medium as claimed in claim 25, wherein:

said first functionality generates and interlinks first type instances of the first basic object types and said second functionality based on the first type instances generates the flow diagram of the technical process, said first functionality generates and interlinks second type instances of the second basic object types and said second functionality based on the first type instances and the second type instances generates the structural data of the technical process.

27. The computer readable medium as claimed in claim 25, wherein the first functionality automatically generated instances of the second basic object types so as to provide at least a portion of the structural data of the technical process.

28. The computer readable medium as claimed in claim 25, wherein for each of the instantiated basic object type, a number of attributes are provided, said attributes comprising material characteristics of the process materials, dimensions of the equipment, and states and control elements for a controllable device.

* * * * *